June 1, 1965  H. L. STILLMAN ETAL  3,187,084
JUNCTION BOX WITH DETACHABLE SUPPORTING MEANS
Filed May 4, 1962  3 Sheets-Sheet 1

INVENTORS
Harry L. Stillman
Frank G. Bellek
Paul J. Zerwes
BY
ATTY.

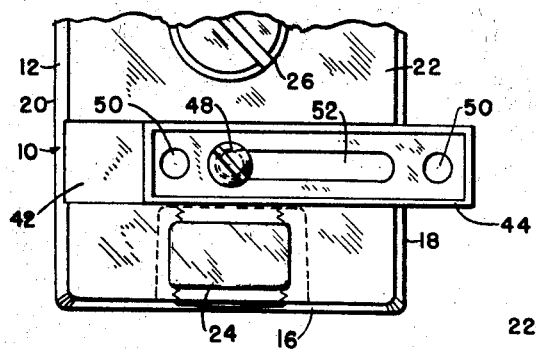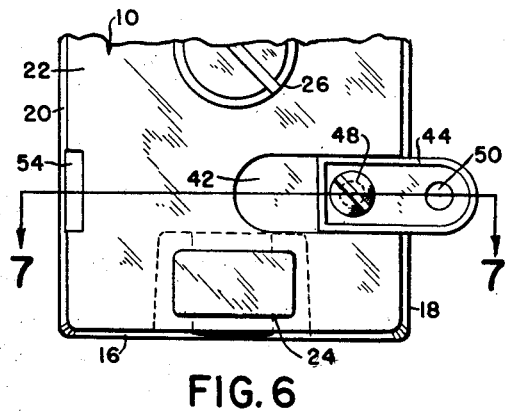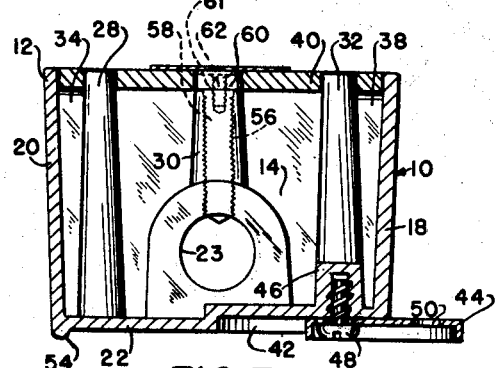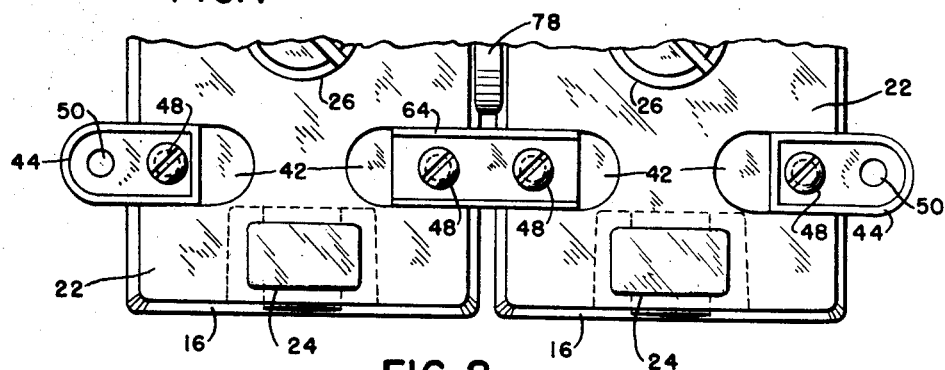

June 1, 1965 H. L. STILLMAN ETAL 3,187,084
JUNCTION BOX WITH DETACHABLE SUPPORTING MEANS
Filed May 4, 1962 3 Sheets-Sheet 3

INVENTORS
Harry L. Stillman
Frank G. Bellek
BY Paul J. Zervyes

ATTY.

3,187,084
JUNCTION BOX WITH DETACHABLE
SUPPORTING MEANS
Harry L. Stillman, Frank G. Bellek, and Paul J. Zerwes, Chicago, Ill., assignors to Bell Electric Company, Chicago, Ill., a corporation of Illinois
Filed May 4, 1962, Ser. No. 192,537
11 Claims. (Cl. 174—58)

This invention relates in general to new and useful improvements in electrical junction boxes and more specifically to an electrical junction box having features rendering it more adaptable to universal securement without additional adaption of brackets or clips.

The primary object of this invention is to provide a unitary electrical junction box with greater utility than those of the prior art.

A more specific object of this invention is to provide a unitary die cast electrical junction box having retractible mounting lugs secured thereto for support and securement of the junction box to a walled surface.

Another object of this invention is to provide an improved unitary die cast electrical junction box having a plurality of retractible securing lugs releasably retained within the bottom wall permitting various mounting positions of the box to a surface and securely joining a plurality of individual boxes in side-by-side gaugable relationship.

A further object of this invention is to provide an improved electrical junction box which is light in weight, rigid in construction and provides a substantially uniform wall thickness about the pipe conduit apertures thus reducing the amount of stresses set up by the pressure generated when inserting a connector or conduit into the internal apertures.

Another object of this invention is to provide an improved electrical junction box whereby a set screw secures a pipe conduit in a boss thus eliminating the need for a threaded pipe conduit or special fittings.

Another object of this invention is to provide an improved unitary die cast electrical junction box having novel mounting means of a component mounting plate adapted to receive and support various types of electrical components.

A further object of this invention is to provide a novel connecting means between adjacently secured junction boxes which permits electrical interconnection between the individual boxes and seals each box from the elements of the weather.

Further objects and advantages of the invention will become apparent as the following description proceeds and the features of novelty which characterize the invention will be pointed out with particularity in the claims annexed to and forming a part of this specification.

In carrying out the objects of the present invention, a unitary die cast junction box is provided with parallel side and end walls and a bottom wall secured in contiguous relationship to provide a cavity in which an electrical component is secured. A plurality of cylindrical bosses are formed internally of the box through which apertures are centrally formed and extend through the side, end and bottom walls, as desired, for receipt of conduit in which electrical wires are disposed for connection to the electrical component within the cavity. The junction box of this invention contemplates not only the normally experienced threaded apertures through the bosses and the walls of the box, but also provides a novel placement of a set screw downwardly through the bosses for contact with the conduit, thus eliminating the need for threading of the apertures, threaded conduit and special connectors.

The box is also provided internally with a plurality of symmetrically disposed upstanding pillars adjacent the end walls which extend to an elevation equal to that of the walls of the housing. A supporting web is integrally formed between each of the pillars and the adjacent wall of the housing and extended upwardly to an elevation below that of the pillars. A mounting plate is positioned over the pillars at each end of the box and is supported by the webs. The electrical component to be disposed in the box, is secured to the mounting plate and a suitable cover is then placed over the open cavity to complete the installation.

Securement of the junction box to a surface and to one another in side-by-side relationship has always been a troublesome and time consuming operation for the electrical construction personnel. The bottom wall of the junction box of the present invention provides a plurality of retractible lugs which may be easily positioned outwardly past the walls of the box for securing the box to the surface or an adjacent box. The securing lugs are held in the retracted position in the bottom wall of the box when not in use and are provided with apertures at one end when extended to receive a nail or screw to anchor the box in position.

For a better understanding of the invention, reference may be had to the accompanying drawings in which:

FIG. 5 is a fragmentary bottom plan view of the electrical junction box illustrating another embodiment of the retractible lugs of this invention with one of the lug members in the outward extending position;

FIG. 6 is a fragmentary bottom plan view of the electrical junction box illustrating still another embodiment of this invention with one of the lug members in the outward extending position;

FIG. 7 is a partially sectioned view taken along the line 7—7 of FIG. 6;

FIG. 8 is a fragmentary bottom plan view illustrating the securement of two adjacent junction boxes by a lug member of this invention;

Figure 1:
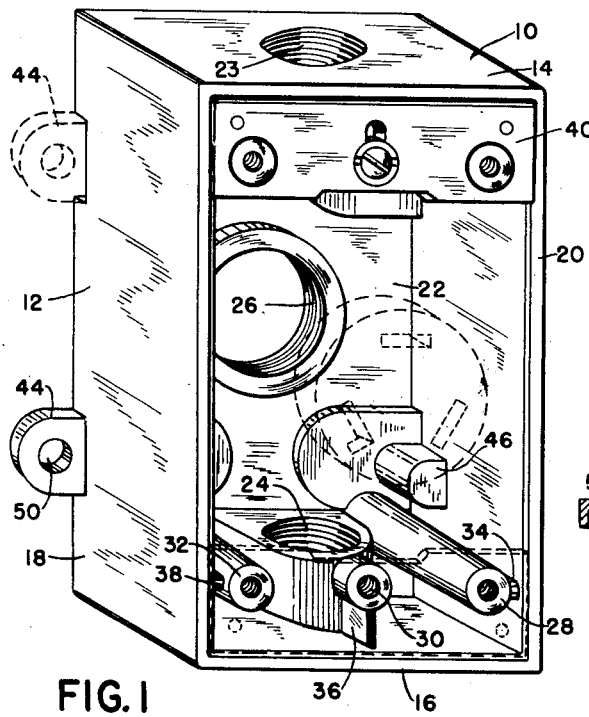
FIG. 1 is a perspective view in front elevation of the electrical junction box of this invention illustrating the relationship of the retractible securing lugs with the box.

Referring now in more detail by reference characters to the drawings, a junction box 10 is illustrated as comprising a unitary cast, open top, shell-like housing 12 including end walls 14 and 16, side walls 18 and 20 and a bottom wall 22. The housing 12 is preferably formed of a lightweight rugged material such as an aluminum alloy by a die casting process. Also formed integrally with and projecting inwardly of the end walls 14 and 16 are longitudinally aligned bosses 23 and 24. It is to be understood that additional bosses may be provided in the walls as required for a particular installation such as boss 26 formed in the bottom wall 22 of the housing. The bosses 23, 24 and 26 are illustrated in the drawings as being internally tapped to receive conduit pipes (not shown) which carry the necessary wiring to be connected with the fixture to be received within the junction box 10. When an electrical junction box is utilized having additional bosses that are not required for use, the apertures may be closed by suitable threaded plugs to seal the housing until the apertures are required for a conduit connection.

The housing 12 is further provided with a plurality of upstanding pillars 28, 30 and 32 symmetrically arranged adjacent each of the end walls 14 and 16. In the embodiment illustrated in the drawings having only singular bosses on the end walls, the pillars 28 and 32 extend upwardly from the bottom wall 22 with the pillar 30 extending upwardly from the upper surface of the boss 24. It is to be understood that both ends of the junction box are identical in configuration and the description is limited only to one end of the box for explanation purposes. The pillar arrangement will be identical with that illustrated in FIG. 1 when additional bosses are provided in the end walls 14 and 16 except that the pillars 28 and 32 will possibly also extend from the surface of a boss. Each of the pillars 28, 30 and 32 extend upwardly to a height flush with the upper edges of the walls of the housing 12 and maintain a uniform cylindrical configuration as they attain the desired height.

Figure 3:
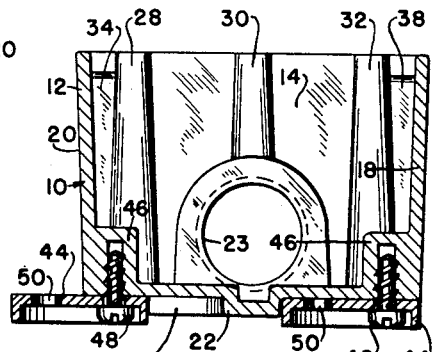
FIG. 3 is a partially sectioned view taken along the line 3—3 of FIG. 2.

Referring more specifically to FIGS. 1 and 3, web members 34, 36 and 38 connecting the pillars 28, 30 and 32 respectively with the adjacent walls of the housing 12. The web members 34, 36, and 38 are integral with the side walls and pillars and extend to a height substantially less than the elevation of the upstanding pillars 28, 30 and 32.

As best seen in FIGS. 1 and 7, a mounting plate 40, having apertures therethrough in spaced apart relationship is received over the upwardly extending pillars 28, 30 and 32 and seats on the upper surface of the interconnecting webs 34, 36 and 38. The mounting plate 40 is supported by a solid three point surface which maintains the mounting plate at an elevation flush with the top of the pillars 28, 30 and 32 and the walls of the housing 12. It is to be understood that the mounting plates are provided to make the junction box adaptable to receive electrical fixtures of different types and dimensions and that an identical mounting plate is received at each end of the box, thus requiring the fabrication of but a single part to obtain the desired versatile results.

Figure 2:
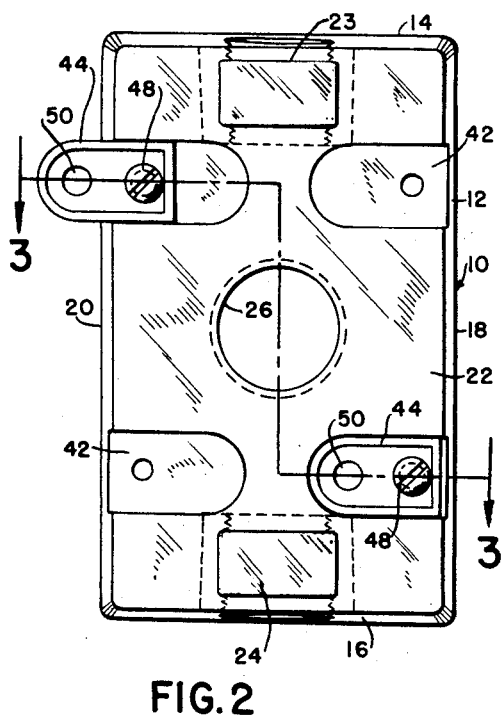
FIG. 2 is a bottom plan view of the electrical junction box illustrating the preferred construction of the invention with one of the retractible lugs in the outward extending position.

Referring now more specifically to FIGS. 2 and 3, the preferred embodiment of the retractible securing lugs of this invention is illustrated as received on the bottom wall 22 of the junction box 10. The outer surface of the bottom wall 22 is provided with spaced apart receiving slots 42 disposed diametrically opposite one another adjacent each end of the box 10. If the box is die cast, the slots 42 may be readily formed requiring little if any subsequent machining operation. As readily seen in FIGS. 2 and 3, the formation of the sliding slots 42 are spaced at predetermined distances, first to provide a uniform thickness to the inwardly formed bosses 23 and 24 permitting uniform stresses to be developed about the bosses and secondly, to provide a widespread, stable securement of the junction box.

Received in each of the slots 42 is a retractible lug member 44, preferably formed from a lightweight material by a stamping process or if desired, to be formed by a casting operation. The retractible lugs 44 are dimensionally formed to permit the disposal of the lug within the slots 42 in a manner to either to be completely within the boundary of the bottom wall 22 or positioned in an outwardly extending direction for securing the box to a surface or an adjacent junction box as will be explained. To enable the lugs 44 to be securely positioned either inwardly or outwardly, an abutment 46 is integrally formed in the housing 12 in alignment over each of the slots 42 which is tapped from the bottom wall 22 for receipt of a hold-down screw 48. Adjacent one end of the lug 44 is an aperture through which this hold-down screw 48 is received to clamp the lug firmly within the slot 42. Adjacent the other end of the lug 44, preferably having a rounded contour, is an aperture 50 therethrough which is utilized to receive a securing nail or screw member when anchoring the junction box to a surface.

Referring now specifically to FIG. 3, the retractible lugs 44 are preferably provided with a thickness greater than the depth of the slots 42 with the back side of the lug being recessed to receive the head of the hold-down screw 48. The lugs 44, therefore will elevate the bottom wall 22 of the box from the surface to which it is secured and provide an air space to prevent moisture and to compensate for variation in the surface structure.

As is now readily understood, with the provision of four spaced apart slots in the bottom wall 22 and the four retractible lugs 44, the junction box 10 may be mounted in a plurality of different positions by utilizing either two, three or four of the lugs and if all of the lugs are not to be utilized, they are easily positioned inwardly and properly secured by the holding screws 48 to be utilized at a subsequent date. Whether the lugs are positioned inwardly or outwardly, they provide a uniform balance or four point contact surface for anchoring and supporting the junction box on the desired surface.

Figure 4:
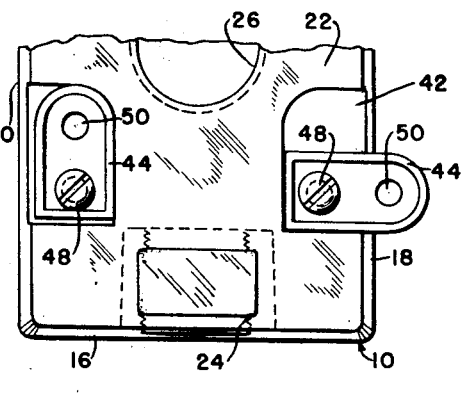
FIG. 4 is a fragmentary bottom plan view of the electrical junction box illustrating an alternate embodiment of the retractible lugs of this invention with one of the lugs in an outward extending position.

Referring now more specifically to FIG. 4, an alternate provision for the retractible lugs of a junction box of this invention is illustrated wherein the slots 42 are formed in spaced apart diametrical position with the retractible lugs 44 being capable of being disposed entirely within the boundary of the bottom wall 22 or extended outwardly to be used for securing the box to a surface. The embodiment of FIG. 4 provides the slots adjacent and parallel to the side walls rather than extending inwardly towards the center of the bottom wall parallel to the end walls as shown in the embodiment in FIGS. 2 and 3. The sliding grooves 42 and the retractible lugs 44 of the embodiment of FIG. 5 are formed in identical manner and are secured and positioned as previously described.

Referring now more specifically to FIG. 5, another embodiment of the retractible securing lugs of this invention is illustrated wherein two spaced apart grooves 42 are formed across the entire width of the bottom wall 22, each receiving an elongated retractible lug 44 having securing apertures 50 at each end and a centrally formed slot 52 through which the securing screw 48 passes to be threadably received in the abutment 46 as previously described. If the retractible lug 44 is to be extended, the screw 48 is partially released and the lug 44 is positioned on either side of the junction box as desired for the particular installation and the screw 48 is then tightened to anchor the lug.

Referring now to FIGS. 6 and 7, a still further embodiment is illustrated wherein two slots 42 are formed, one on each side of the junction box bottom wall 22 in spaced apart relationship. To provide the desired elevated stable securing position whereby the bottom wall 22 is not in abutting relationship with the surface, a downwardly extending lip 54 is integrally formed diametrically opposite each of the slots 42 as an extension of the side walls. The lip portions 54 depend a distance equal to the height of the lugs 44 below the outer surface of bottom wall 22 when disposed in the slots 42.

Referring now to FIG. 7, the junction box of this invention is further provided with a novel means whereby the pipe conduit entering the bosses 23 and 24 may be secured without the utilization of a threaded portion or threaded connectors. An enlarged tapped aperture 56 is centrally formed through the pillar 30 whereby a screw member 58 may be received and extend downwardly to a point where the innermost end of the screw member 58 will physically engage and clamp the conduit member against the inner side wall of the boss 23. The head portion 60 of the screw member 58 has an outside diameter equal to that of the pillar 30 with the pillar 30 being reduced in elevation in an amount equal to the thickness of the head 60. The uppermost surface of the head portion 60 will be flush with the upper surfaces of the adjacent symmetrically arranged pillars 28 and 32 for receiving the mounting plate 40. The screw member 58 is then provided with a centrally disposed threaded aperture 61 which receives a screw member 62 to secure the desired fixture or cover plate to the junction box. Thus, it is apparent, that not only may the junction box be utilized for a threaded conduit but a conduit may be suitably clamped and secured without the necessity of additional threading of the conduit or connectors.

When the electrician is making an installation utilizing the box 10 of this invention for the purpose of installing a fixture, the plates 40, having the correct mounting holes, are dropped down over the upstanding pillars with the plates seating on the interconnecting webs. The plates then may be secured, if desired, by peening a portion of the wall against the pillars or screws engaging the pillars, to secure the plate in position although subsequent securement of the cover plate anchors the mounting plate to the pillars. The fixture may then be connected with the desired wiring and positioned in the cavity of the junction box and suitably anchored by the threaded apertures of the fixture plate.

It is of course understood that a suitable cover (not shown) having an access opening to suit the particular fixture mounted into the junction box may be secured by engaging the tapped openings in the upstanding pillars.

Having installed the desired fixture into the junction box the electrician will then decide the proper location for the junction box on the wall surface or wherever the junction box is to be mounted, and will then extend the retractible lugs as required to anchor the entire junction box to the surface.

The above description has been directed to the securement of a single junction box to a surface. Frequently it is desirable to have a plurality of junction boxes electrically interconnected in sealed relationship and mounted on the same surface in close proximity to one another.

Figure 9:
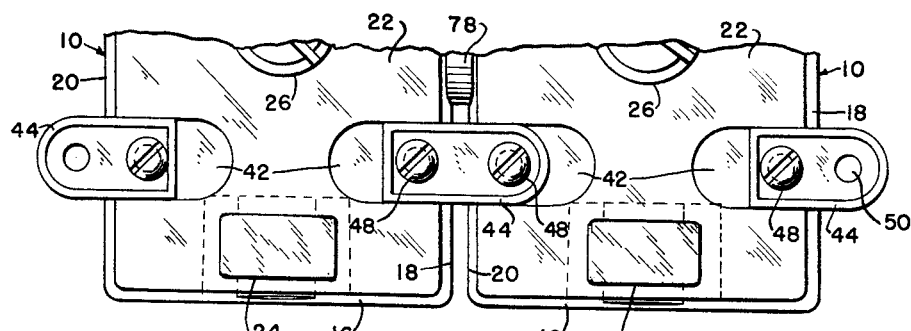
FIG. 9 is a fragmentary bottom plan view illustrating an alternate embodiment for the securement of two adjacent junction boxes by a lug member of this invention.

Referring now specifically to FIGS. 8 to 13, inclusive, the retractible lugs of this invention are illustrated as securing adjacent junction boxes in side-by-side relationship with a novel, sealed electrical interconnection between the adjacent side walls. The bottom wall 22 of the box is provided with slots 42 in the manner described for the preferred embodiment of this invention illustrated in FIGS. 2 and 3. The retractible lugs 44 are positioned and secured as previously described. When securing two or more of the junction boxes in side-by-side relationship, the extended ends of the lugs 44 of one box is received in the slots 42 of the adjacent box with the openings 50, previously described for anchoring the box to a surface in alignment with the threaded abutment 46 in the adjacent box for securement by a hold-down screw 48 as best seen in FIG. 9.

An alternate embodiment for the securement of two junction boxes in side-by-side relationship is illustrated in FIG. 8 wherein an elongated lug 64 is provided which is received in the opposing slots 42 to increase the space between the two boxes if desired. The lug 64 is fabricated and is secured to each of the adjacent boxes in the manner just described.

Referring now more specifically to FIGS. 10–13 inclusive, it is not only necessary to secure several junction boxes in adjacent relationship, as just described, but to permit electrical interconnection between the individual boxes while maintaining the desired weatherproof sealing of each individual box.

Figure 10:
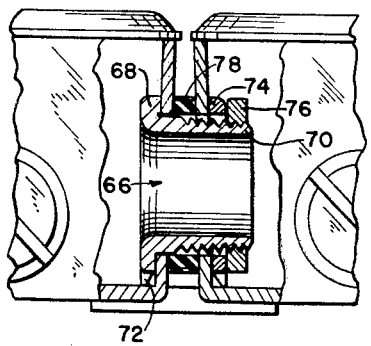
FIG. 10 is a fragmentary partially sectioned cut-away view in side elevation illustrating the electrical interconnection between adjacent side-by-side junction boxes.
Figure 11:
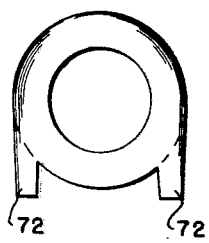
FIG. 11 is an end elevational view of a connector bushing for securing the boxes for electrical interconnection.
Figure 12:
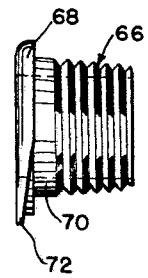
FIG. 12 is a side elevational view of the connector bushing illustrated in FIG. 11.

As best seen in FIGS. 10, 11 and 12, a connector bushing 66 preferably die cast from an aluminum alloy, is provided with a flanged head portion 68 integrally formed on a tapered threaded shank portion 70. The flanged head portion 68 is received against the inner surface of the adjacent side wall of the box and provides integral spaced apart depending legs 72 which are also in surface-to-surface contact with the inner surface of the side wall with the lowermost surface of the legs seating in the bottom wall of the box. The shank portion extends through the opposing apertures in the adjacent side walls and receives thereon, within the cavity of the adjacent box, a washer member 74 and a connector nut 76. The washer member 74 is provided with an external configuration identical to the flange head portion 68 of the connector bushing for surface-to-surface contact with the inner surface of the side wall of the adjacent box.

Figure 13:
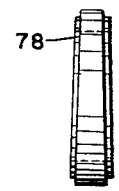
FIG. 13 is a side elevational view of the sealing washer utilized for sealing the adjacent boxes in weatherproof electrical interconnection illustrated in FIG. 10.

Since the side walls of the boxes have a slight inward taper, a compression washer 78 as seen in FIG. 13, is provided with a mating taper for disposal between the outer surface of the two adjacent side walls to effect a seal about the shank of the connector bushing with the adjacent side walls of the boxes. The washer 78 is preferably formed from an elastomer, such as neoprene, which upon compression, through the action of the connector nut 76 being tightened, will form a weatherproof seal with the adjacent side walls about the connector bushing 66.

The electrical weatherproof interconnection just described, also serves to securely join the upper portion of the two adjacent boxes together to combine with the securing lugs previously described to provide a solid composite singular unit of the two individual boxes.

Figure 10A:
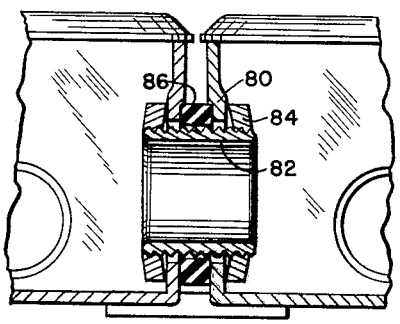
FIG. 10a is a fragmentary partially sectioned cut-away view in side elevation illustrating an alternate electrical interconnection between adjacent side-by-side junction boxes.

Referring now more specifically to FIG. 10a, an alternate embodiment of the weatherproof electrical interconnection is illustrated for securing two or more junction boxes in side-by-side relationship. As previously mentioned, the side walls, 18 and 20 are provided with a downwardly or inwardly taper. Each of the opposing side walls is centrally provided with a recess surface 80 which is at right angles to the upper and lower planes of the box. A conventional pipe nipple 82 is disposed through apertures in the surface 80 and receives on each end thereof for securement, a conventional mating connector bushing nut 84.

To attain the desired weatherproof seal about the electrical interconnection means, a sealing washer 86 is disposed about the nipple 82 between the adjacent sidewalls. The sealing washer 86, like washer 78 previously described, is preferably formed from a flexible material such as neoprene, which is easily compressed to insure a leakproof seal about the units.

By providing the tapered side walls with a recess or indented surface 80, conventional nipples, nuts and sealing washers may be used to form the desired weatherproof electrical interconnection between the two junction boxes.

From the above description it is now readily understood that the invention provides an electrical junction box of wide utility for securement of various electrical components and that the box may be mounted in the desired position, individually or securely joined in weatherproof electrical interconnection with other similar junction boxes without additional brackets or clamps. It is realized that various designs and structural modifications of the construction illustrated might be devised by one skilled in the art, which would be considered well within the purview of the inventor and which should be considered as being within the scope of the appended claims.

What is claimed is:

1. An electrical junction box comprising:

a die cast housing having bottom, end and side walls defining a cavity for the receipt of an electrical fixture, one of said side walls having an opening for the reception of a threaded nipple therethrough interconnecting the side wall of an adjacent box thereto in spaced relationship, a plurality of pillars within the cavity adjacent to each end wall, one of which is in close proximity to said side wall, lug members on the outside of said bottom wall, means at one end of said pillar for supporting an electric fixture in said cavity, supporting means including a screw adjacent to the other end of the pillar for rigidly supporting one of said lug members on said bottom wall, said bottom wall having a slot in the bottom wall around said screw and lug and extending through the outside boundary of the bottom edge at the side wall adjacent to said pillar, said recess receiving said lug in both of two alternate positions as secured by said screw in one of which said lug extends beyond said bottom edge for engagement with said adjacent box when present and also beyond the level of the outside bottom surface of said bottom wall.

2. An electrical junction box comprising:

a housing having bottom, end and side walls defining a cavity for the receipt of an electrical fixture, a boss formed within the cavity on one of said walls having an aperture therethrough for mating engagement with a pipe conduit, a plurality of pillars within the cavity adjacent to each end wall, one of said pillars extending above said boss to a level substantially equal to the height of said one wall disposed above said boss having a centrally formed threaded aperture therethrough communicating with the aperture in the boss, a screw member received in said threaded aperture engaging and securing the pipe conduit within said boss, a supporting web member disposed between a wall and each of said pillars, a mounting plate disposed over said pillars at each end of the box and resting on the supporting webs, and means securing the mounting plate in supported relationship about said pillars on said supporting web members.

3. An electrical junction box comprising:

a die cast housing having bottom, end and side walls defining a cavity for the receipt of an electrical fixture, a boss formed within the cavity on one of said walls having an aperture therethrough for mating engagement with a pipe conduit, a plurality of pillars within the cavity adjacent to each end wall, one of said pillars extending above said boss to a level substantially equal to the height of said one wall and having a centrally disposed threaded aperture therethrough, a screw member received in said threaded aperture engaging and securing the pipe conduit within said boss, a supporting web member disposed between a wall and each of said pillars, a mounting plate disposed over said pillar at each end and resting on the supporting webs, means securing the mounting plate in supported relationship about said pillars on said supporting web members, and retractable lug members secured to the bottom wall of the housing for disposal in alternate positions, one within the boundary of the bottom wall and another extending therebyond for securing the housing to a surface.

4. An electrical junction box comprising:

a die cast housing having bottom, end and side walls defining a cavity for the receipt of an electrical fixture, a plurality of bosses formed within the cavity on certain walls having threaded apertures therethrough for mating engagement with pipe conduits, a plurality of symmetrically spaced upstanding pillars within the cavity adjacent each end wall, means carried by one of said pillars for securing a pipe conduit in one of said bosses, a plurality of supporting webs within the cavity, each of said webs disposed between a wall and a pillar, upper surface of said web members at an elevation lower than the upper surface of said pillars, a mounting plate disposed over said pillars at each end seating on said supporting webs, means securing said mounting plate in supported relationship of said pillars on said supporting members, securing lugs on the bottom wall of the housing for securing the housing to a surface, and supporting means including a screw adjacent to the other end of a pillar for rigidly supporting one of said lug members on said bottom wall.

5. In combination with an electrical junction box having bottom, end and side walls defining a cavity for the receipt of an electrical fixture, a securing device comprising:

a plurality of elongated securing lugs secured in spaced apart relationship to the outer surface of the bottom wall of the box and having recesses in their exposed faces, said outer surface of the bottom wall having elongated recessed grooves formed therein partially receiving said securing lugs, and a screw member passing through each of said securing lugs threadably engaging the bottom wall securing said lugs to the bottom with their heads disposed in said recesses, release of said screw members permitting the lugs to be disposed in either one of two alternate positions in one of which the said lugs extend outwardly past the side walls, the extended end of each lug having an aperture therethrough for securing the box to a mounting surface.

6. In combination with electrical junction boxes each having a bottom, end and side walls defining a cavity for receipt of an electrical fixture, a securing device for joining a plurality of junction boxes in side-by-side electrically interconnected relationship comprising:

recessed slots formed in the outer surface of the bottom wall in spaced apart relationship adjacent the juncture of the side walls with the bottom wall;

retractible securing lugs disposed within said slots extensible beyond the side walls of the box, extended ends of the securing lugs on one side of a box received and secured in the slots on one side of another box when said boxes are positioned in side by side relationship fixedly securing the boxes together; and means for securing the lugs in said slots including fastening elements interconnecting the lugs and bottom wall of the box having heads recessed within the outer face of the lugs.

7. In combination with electrical junction boxes having bottom, end and side walls defining a cavity for receipt of an electrical component, a securing device for joining a plurality of junction boxes in side-by-side electrically interconnected sealed relationship comprising:

recessed slots formed in the outer surface of the bottom wall in spaced apart relationship adjacent the juncture of the side walls with the bottom wall;

retractible securing lugs disposed within said slots extensible beyond the side walls of the box;

extended ends of the securing lugs on one side of a box received and secured in the slots on one side of another box when said boxes are positioned in side by side relationship fixedly securing the boxes together;

a connector bushing secured between the adjacent side walls defining a communicating passage between the cavities of the adjacent boxes, and a seal member disposed about the connector between the side walls of the adjacent boxes forming a leakproof seal about said bushing.

8. The combination called for in claim 7 wherein said connector bushing comprises:
   a head flange portion integral with a tapered threaded shank portion; said flange portion in surface-to-surface contact with the inner surface of the side wall of one box;
   a washer member received over the threaded shank portion within the cavity of the adjacent box; and
   a nut member threadably received on the end of the threaded shank portion to fixedly secure the bushing between the two boxes.

9. The combination called for in claim 7 wherein said seal member is an elastomeric washer configured to matingly engage the contour of the adjacent side walls and the bushing to form a leakproof seal therewith upon compression by the side walls as the connector bushing is fixedly secured.

10. A weatherproof electrical junction box comprising:
   a housing having bottom wall and end and side walls defining a cavity for the reception of an electrical fixture therein,
   a boss formed on one of said walls and bottom wall disposed within the cavity and having an opening through said one of said walls threaded over a major portion of its length for mating engagement with a threaded pipe conduit in sealed relationship,
   a pillar within the cavity formed integrally on said boss adjacent said one wall of said walls and including a web portion extending to and integral with said one wall, said pillar extending above said boss to a level substantially equal to the height of said one wall with said web portion terminating a spaced distance below said level, said pillar having an opening therethrough opening into said opening in the box and being internally threaded a major portion of its length,
   means on said bottom wall for securing said box to a mounting surface, including a plurality of elongated securing lugs partially received in spaced elongated recessed slots formed in the outer surface of the bottom wall on opposite sides of said boss, each slot extending through an adjacent boundary of said bottom wall and each lug extending in the plane of said bottom to a point beyond said boundary and having securement apertures through the extending portion, the major portion of the contour to each slot closely following the contour of its respective lug supporting same against relative movement in said plane, said slots being spaced at predetermined distances from each other to provide a uniform thickness to said boss permitting uniform stresses to be developed about said boss.

11. An electrical junction box comprising: a die cast housing having bottom, end and side walls defining a cavity for the receipt of an electrical fixture therein,
   a boss formed on one of said end walls and bottom walls disposed within the cavity and having an opening through said one of said walls threaded over a major portion of its length for engagement with a pipe conduit,
   a plurality of pillars within the cavity adjacent to each end wall disposed on opposite sides of said boss in close proximity to said side walls,
   threaded means at one end of said pillars for supporting an electric fixture in said cavity,
   recessed grooves formed in the outer surface of the bottom wall adjacent to the juncture of the side walls with the bottom wall and adjacent to the other ends of said pillars and boss providing a uniform thickness in said bottom wall permitting uniform stresses to be developed about said boss,
   elongated lugs for supporting said box on a mounting surface received in said recessed grooves and having recesses in their exposed faces, the major portion of the contour of each recessed groove closely following the contour of its respective lug supporting same against relative movement in said plane,
   supporting means adjacent the other end of said pillar for rigidly supporting said lug members including a screw member passing through each of said elongated lugs with the heads of the screw members received in the recesses and threadably engaging the bottom wall within said recessed grooves,
   the release of said screw members permitting the lugs to be disposed in either one of two alternate positions in one of which said lugs extend in the plane of said bottom surface outwardly past adjacent side walls,
   said elongated lugs having securement apertures through the extending portions for securing the box to the mounting surface.

References Cited by the Examiner

UNITED STATES PATENTS

| 876,619 | 1/08 | Bliemeister | 220—3.94 |
| 886,978 | 5/08 | Holabird | 220—3.92 |
| 2,836,646 | 5/58 | Paolinelli | 174—61 |
| 2,991,327 | 7/61 | Bellek | 174—53 |
| 3,139,480 | 12/61 | Desloge | 174—65 |

FOREIGN PATENTS

| 148,882 | 11/52 | Australia. |
| 1,152,182 | 2/58 | France. |

JOHN F. BURNS, *Primary Examiner.*

JOHN P. WILDMAN, E. JAMES SAX, LARAMIE E. ASKIN, *Examiners.*